United States Patent
Beardsley et al.

(10) Patent No.: US 6,993,629 B2
(45) Date of Patent: Jan. 31, 2006

(54) PRESTAGING DATA INTO CACHE IN PREPARATION FOR DATA TRANSFER OPERATIONS

(75) Inventors: Brent Cameron Beardsley, Tucson, AZ (US); Jeffrey Allen Berger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 10/194,204

(22) Filed: Jul. 12, 2002

(65) Prior Publication Data

US 2002/0178331 A1 Nov. 28, 2002

Related U.S. Application Data

(63) Continuation of application No. 09/298,119, filed on Apr. 23, 1999, now Pat. No. 6,449,697.

(51) Int. Cl.
G06F 12/06 (2006.01)

(52) U.S. Cl. .................. 711/137; 711/170; 711/113; 710/36

(58) Field of Classification Search ......... 711/137–138, 711/4, 112–114, 170–172, 202–203, 206–207, 711/209, 154; 710/5, 6, 36
See application file for complete search history.

(56) References Cited

U.S. PATENT DOCUMENTS

| | | | |
|---|---|---|---|
| 4,408,273 A | 10/1983 | Plow | |
| 4,855,907 A | 8/1989 | Ferro, Jr. et al. | |
| 4,980,823 A | 12/1990 | Liu | |
| 5,355,477 A | 10/1994 | Strickland et al. | |
| 5,377,345 A | 12/1994 | Chang et al. | |
| 5,426,761 A | 6/1995 | Cord et al. | |
| 5,499,354 A | 3/1996 | Aschoff et al. | |
| 5,499,355 A | 3/1996 | Krishnamohan et al. | |
| 5,530,941 A | 6/1996 | Weisser et al. | |
| 5,758,119 A | 5/1998 | Mayfield et al. | |
| 5,764,946 A | 6/1998 | Tran et al. | |
| 5,802,566 A | 9/1998 | Hagersten | |
| 5,809,529 A | 9/1998 | Mayfield | |
| 5,887,151 A * | 3/1999 | Raz et al. | 712/206 |
| 6,029,230 A * | 2/2000 | Ng | 711/159 |
| 6,449,697 B1 * | 9/2002 | Beardsley et al. | 711/137 |
| 6,484,234 B1 * | 11/2002 | Kedem | 711/113 |
| 6,622,142 B1 * | 9/2003 | Murray et al. | 707/100 |
| 2003/0135478 A1 * | 7/2003 | Marshall et al. | 707/1 |

FOREIGN PATENT DOCUMENTS

WO    WO 9814878 A1 *   4/1998

OTHER PUBLICATIONS

ANSI, "Information Technology—Small Computer System Interface—2", reference No. X3.131–199X, revision 10L, Sep. 7, 1993, pp. 178–182.

(Continued)

Primary Examiner—Pierre Bataille
(74) Attorney, Agent, or Firm—David W. Victor; Konrad Raynes & Victor LLP

(57) ABSTRACT

Disclosed is a method, system, and program for prestaging data into cache from a storage system in preparation for data transfer operations. A first processing unit communicates data transfer operations to a second processing unit that controls access to the storage system. The first processing unit determines addressable locations in the storage system of data to prestage into cache and generates a data structure capable of indicating contiguous and non-contiguous addressable locations addressable locations in the storage system including the data to prestage into the cache. The first processing unit transmits a prestage command to the second processing unit. The prestage command causes the second processing unit to prestage into cache the data at the addressable locations indicated in the data structure. The first processing unit then requests data at the addressable locations indicated in the data structure. In response, the second processing unit returns the requested data from the cache.

37 Claims, 4 Drawing Sheets

OTHER PUBLICATIONS

IBM Technical Disclosure Bulletin, vol. 38, No. 6, "Methods of Specifying Data Prefetching Without a Separate Instruction", Jun. 1995, pp. 355–356.

IBM Technical Disclosure Bulletin, vol. 38, No. 9, "Method for 'Smart Prefetch' of Data from Main Memory by a Memory Controller for Access by a CPU", Sep. 1995, pp. 203–204.

IBM Technical Disclosure Bulletin, vol. 39, No. 3, "Cache Blocks/Lines by Stride", Mar. 1996, p. 355.

* cited by examiner

PRESTAGING DATA INTO CACHE IN PREPARATION FOR DATA TRANSFER OPERATIONS

This application is a continuation of pending U.S. patent application Ser. No. 09/298,119 filed Apr. 23, 1999, now U.S. Pat. No. 6,449,697.

BACKGROUND OF THE INVENTION

1. Field of the Invention

The present invention relates to a method, system, and program for prestaging data into cache from a storage system in preparation for data transfer operations.

2. Description of the Related Art

Data prestaging techniques are used to prestage data from a non-volatile storage device, such as one or more hard disk drives, to a high speed memory, such as a volatile memory device referred to as a cache, in anticipation of future data requests. The data requests may then be serviced from the high speed cache instead of the storage device which takes longer to access. In this way, data may be returned to the requesting device faster.

During a sequential read operation, an application program, such as a batch program, will process numerous data records stored at contiguous locations in the storage device. It is desirable during such sequential read operations to prestage the sequential data into cache in anticipation of the requests from the application program. Present techniques used to prestage sequential blocks of data include sequential caching algorithms systems, such as those described in the commonly assigned patent entitled "CACHE DASD Sequential Staging and Method," having U.S. Pat. No. 5,426,761. A sequential caching algorithm detects when a device is requesting data as part of a sequential access operation. Upon making such a detection, the storage controller will begin prestaging sequential data records following the last requested data record into cache in anticipation of future sequential accesses. The cached records may then be returned to the application performing the sequential data operations at speeds substantially faster than retrieving the records from a non-volatile storage device.

Another prestaging technique includes specifying a block of contiguous data records to prestage into cache in anticipation of a sequential data request. For instance, the Small Computer System Interface (SCSI) provides a prefetch command, PRE-FETCH, that specifies a logical block address where the prestaging operation begins and a transfer length of contiguous logical blocks of data to transfer to cache. The SCSI PRE-FETCH command is described in the publication "Information Technology-Small Computer System Interface-2," published by ANSI on Apr. 19, 1996, reference no. X3.131-199x, Revision 10L, which publication is incorporated herein by reference in its entirety.

Both these techniques for prestaging data records in anticipation of sequential operations are not useful for data records that have a logical sequential relationship but are stored at non-contiguous or dispersed physical locations in the storage device. Such prior art prestaging techniques are intended for sequential operations accessing data records stored at contiguous physical locations. For instance, the sequential detection algorithms and SCSI PRE-FETCH command do not prestage noncontiguous blocks. If the sequential detection algorithms and the SCSI PRE-FETCH command are used to prestage a range of data records including both the non-contiguously stored data records that are needed, then they will also prestage data records that the application program does not need. The above techniques waste processor cycles and cache storage space by prestaging data records that will not be requested. Thus, current prestaging techniques do not provide an optimal solution for prestaging non-contiguous tracks into cache.

Thus, there is a need in the art for improved prestaging techniques.

SUMMARY OF THE PREFERRED EMBODIMENTS

To overcome the limitations in the prior art described above, preferred embodiments disclose a method, system, and program for prestaging data into cache from a storage system in preparation for data transfer operations. A first processing unit communicates data transfer operations to a second processing unit that controls access to the storage system. The first processing unit determines addressable locations in the storage system of data to prestage into cache and generates a data structure capable of indicating contiguous and non-contiguous addressable locations in the storage system including the data to prestage into the cache. The first processing unit transmits a prestage command and the data structure to the second processing unit. The prestage command causes the second processing unit to prestage into cache the data at the addressable locations indicated in the data structure. The first processing unit then requests data at the addressable locations indicated in the data structure. In response, the second processing unit returns the requested data from the cache.

In alternative embodiments, the storage system storage space is logically divided into multiple tracks, wherein each track includes one or more data records. Each data record includes an index area providing index information on the content of the data record and a user data area including user data. The addressable locations indicated in the data structure comprise tracks in the storage system including the data records to prestage into the cache. In such embodiments, the data structure indicates addressable locations in the storage system including the data to prestage into the cache.

In yet further embodiments, the data structure comprises a bit map data structure having bit map values for addressable locations in the storage system. Bit map values of one in the data structure indicate corresponding addressable locations including the data to prestage into cache.

In still further embodiments, the addressable locations in the data structure correspond to data having a logical sequential ordering within the first processing unit.

In further instances, the addressable locations in the storage system including the data having the logical sequential ordering are at non-contiguous addressable locations in the storage system.

Preferred embodiments thus provide a mechanism to prestage data into cache using a data structure indicating addressable locations to prestage in a range of addressable locations. Preferred embodiments are particularly applicable to situations where an application program performs a sequential operation to process data records according to a logical sequential ordering. However, such data records having the logical sequential ordering may be stored at non-contiguous physical locations on a storage device. In such case, the data structure of the preferred embodiments can cause another processing unit, such as a storage controller that controls access to the storage system, to prestage into cache the data having a logical sequential relationship, yet stored at non-contiguous physical locations in the storage device. In this way, when the application program requests the data having the logical sequential ordering during sequential processing, the storage controller can return the requested data directly from cache. Returning the data from cache is substantially faster than retrieving the requested data from non-contiguous physical locations from the storage device.

Preferred embodiments thus improve system performance for application programs performing sequential operations on data logically ordered yet stored at non-contiguous physical location by prestaging the logically ordered data into a high-speed cache.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
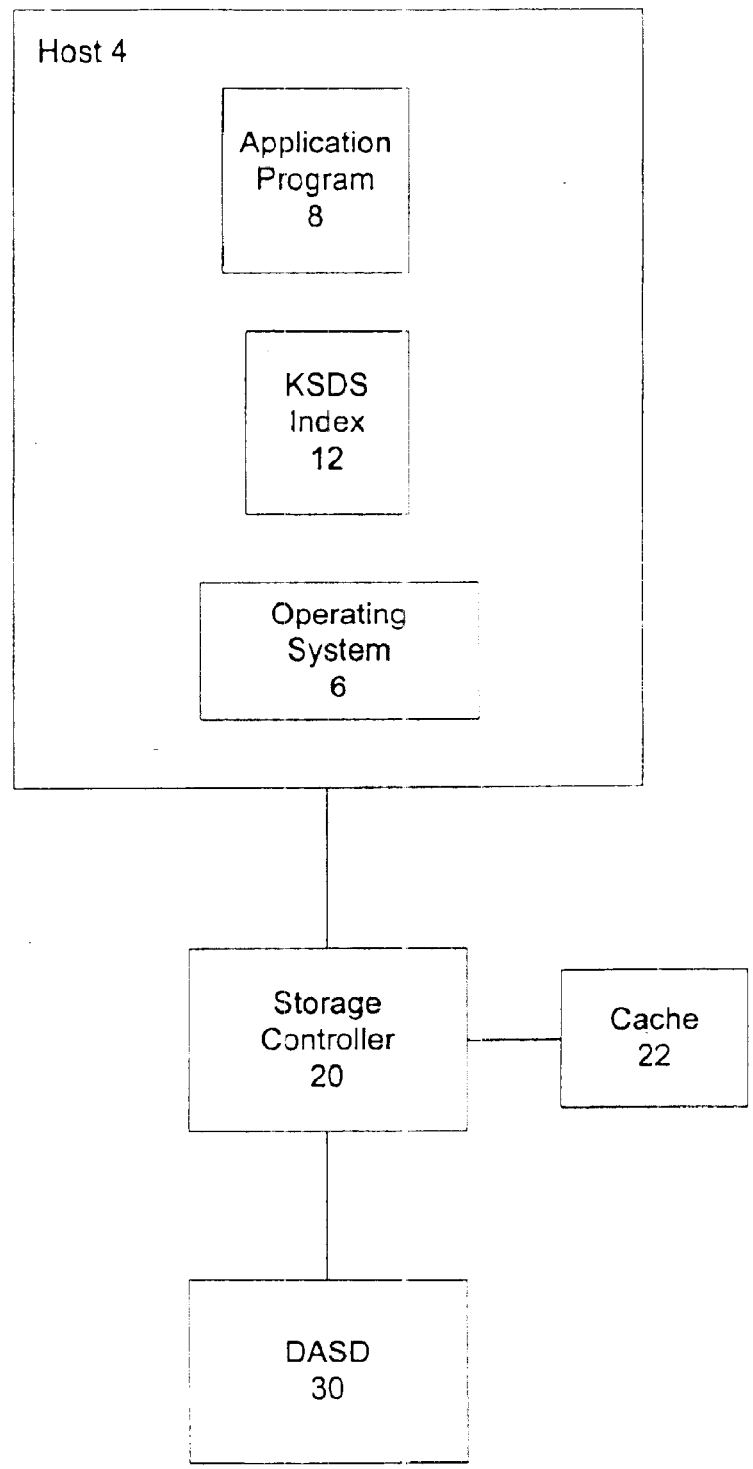
FIG. 1 is a block diagram illustrating a software and hardware environment in which preferred embodiments of the present invention are implemented.

In the following description, reference is made to the accompanying drawings which form a part hereof and which illustrate several embodiments of the present invention. It is understood that other embodiments may be utilized and structural and operational changes may be made without departing from the scope of the present invention.

Problems with Current Prestaging Techniques

A computer application program may maintain a logical mapping or index that maps data records to key values describing a particular ordering of data records. The computer may also maintain a physical mapping that maps the key values to physical locations on a storage device. There may also be additional mappings to map the data records to the exact physical locations on the storage device.

Oftentimes, an application program, such as batch programs, may want to sequentially access numerous data records according to key values that uniquely identify the data records. However, the actual data records, which are logically sequentially ordered according to the key values, may be dispersed throughout the storage device, i.e., not stored at contiguous physical locations. In such case, if the storage device is comprised of one or more hard disk drives or a tape storage device, then there will be latency delays while the storage device performs electromechanical set-up operations, e.g., moving an actuator arm to the read location, to access the noncontiguous physical storage locations on the disk drive storing the data records identified according to the logically sequential keys. Such latency delays in accessing non-contiguous physical locations could cause substantial delays in providing the application program with the records during the sequential processing of the logically sequential records.

The above described problem may arise when the International Business Machines Corporation (IBM) Virtual Storage Access Method (VSAM) is used to reference user data records stored in a storage device. The storage device may be a direct access storage device (DASD), which is comprised of numerous linked hard disk drives. A host computer communicates I/O operations to a storage controller, such as the IBM 3990 Storage Controller, which controls access to the DASD. Physical locations on the DASD are identified according to cylinder, track, and the record on the track, i.e., CCHHR, where CC indicates the cylinder, HH indicates the track, and R indicates the record on the track.

One data set structure VSAM utilizes to stores data is the Key Sequenced Data Sets (KSDS). KSDS is particularly applicable to data records that include a key value, which provides a unique identifier of the record. The storage space for a KSDS file is divided into a plurality of control areas (CAs), which may comprise a single cylinder of storage space or fifteen tracks. Each CA is comprised of multiple control intervals (CIs). A CI can be comprised of one or more records on the track. User data records are written to particular CIs. For instance, a CA may be comprised of 15 tracks, e.g., tracks 0–14, including one or more CIs for each track, and three free tracks, e.g., tracks 12, 13, and 14. The user may specify a certain amount of free space in each CI and a CA. The free space is provided for insertion and lengthening of records into a CI. The operating system would write user data records according to their logical key order to the first CI in a CA, i.e., $CI_0$, until the CIs in the CA were filled. With this system, data records would be written to the CIs according to their key ordering, e.g., the data record with the first key value as the first record in the first CI in the first CA. Thus, the data records would be written to the CIs according to the ordering of their keys at contiguous physical locations defined by the CIs.

One event that could cause user data records arranged according to the logical key value to be dispersed at non-contiguous physical locations in the storage device is CI and CA splitting. CI splitting occurs when an individual CI is filled with user data records. For instance, a CA may be set equivalent to a cylinder or 15 tracks, and tracks 0–11 are for user data and tracks 12–14 are specified as free. If user data records are written sequentially according to the key values to contiguous physical locations within the CIs in tracks 0–11 of the CA and a user data record needs to be inserted or lengthened, then the operating system 6 will move half the user data records in the CI which is involved in the insert or lengthening operation to a CI in the free space of the CA, e.g., in track 12, to make room in the current CI for the inserted or lengthened record. With this control interval (CI) split, user data records, having a sequential logical key ordering, that were previously in the same CI, at contiguous physical locations, are now separated into non-contiguous CIs. The user data records moved to the free space CI in track 12 are no longer at contiguous physical locations with respect to the logically contiguous user data records that remained in the CI where the split occurred. For instance, if a CI had user records with key values of A, B, C, and D, and the C and D records were moved to track 12, then the C and D records would no longer be contiguous on the storage device to A and B. Hence, CI splitting causes user data records that are sequentially ordered with respect to logical index values to be stored at non-contiguous physical locations, e.g., non-contiguous CCHHRs.

Further, if all the tracks, including the free tracks, e.g., tracks 0–14, in a CA are filled with user data records, then the insertion or lengthening of a record in the CA, will cause a CA split, where certain records in the CA may have to be moved to a new CA to make room for the inserted or lengthened records. If the user data records were in a logical sequential order with respect to a key index, then such records moved to a different CA during the split would no longer have a sequential physical ordering as they are in a different CA. Such splitting may occur whenever a record is inserted or an existing record is lengthened during sequential or direct processing of user data records.

Problems arise when the operating system and storage system fails to maintain sequential ordering in both the logical and physical domains. An application program may process records in a sequential mode with respect to a logical sequential ordering of key values. However, such logically sequential records, for the reasons discussed above, may not be stored at contiguous physical locations, i.e., contiguous CIs and CCHHRs. In such case, delays may occur in retrieving these logically sequential records stored at non-contiguous physical locations. If the application program is performing fast sequential operations, then delays in accessing the logically sequential data records at non-contiguous physical locations, which requires seek and rotation operations on the disk surface, may substantially degrade the performance of the application program's sequential operations.

Hardware and Software Environment

FIG. 1 illustrates a hardware and software environment in which preferred embodiments may be implemented. A host system 4 includes an operating system 6, an application program 8, and a KSDS index 12. The operating system 6 could comprise the IBM ESA/390 operating system including a data management component such as the IBM Distributed File Manager Storage Management System for MVS (DFSMS/MVS) software to provide the operating system 6 access to VSAM data sets and other data types. The application program 8 may comprise a batch program or a database program that performs sequential processing of data records according to a key ordering.

A storage controller 20 receives input/output (I/O) operations from the host system 4 and executes the received I/O operations against the direct access storage device (DASD) 30. A cache 22 is comprised of one or more volatile memory devices. The storage controller 20 would stage data tracks into the cache 22 that are retrieved from the DASD 30 in anticipation of subsequent requests for the data. Further, the storage controller 20 may prestage data tracks into cache before they are requested, in anticipation of such requests for the data. The DASD 30 may store data in a Count-Key-Data (CKD) format or fixed block format such as is used with SCSI. Details of a specific implementation of a storage controller 20, operating system 6, and data transfer operations there between are described in the IBM publications: "Enterprise Systems Architecture/390: ESCON I/O Interface," IBM document no. SA22-7202-02 (Copyright IBM Corp., 1990, 1991, 1992) and "IBM 3990 Storage Control Reference (Models 1, 2, and 3)," IBM document no. GA32-0099-06 (Copyright IBM Corp., 1998, 1994), which publications are incorporated herein by reference in their entirety.

In the CKD format, a count field provides the name and format of a record, the key length, and the data length. The key field, which is optional and unrelated to the index key used to provide logical ordering to the application program 8 records, is used for searching and may indicate the last data set in the record. The data field provides a variable length record of user data sets. The number of CKD records that can be placed on a track depends on the length of the data areas of the records. The physical location of a CKD record on a track is identified according to the R value of the CCHHR physical location identifier. The user data area of a CKD record may include multiple user data records, such as data records (r) used by the application program 8 that correspond to key values (K). For instance, a track may include twelve 4K CKD records, i.e., four R values in a CCHH, and the user data area of each CKD record may be comprised of multiple application records (r) having corresponding key values (K).

The host system 4 may communicate with the storage controller 20 via channel paths by executing channel programs. In such case, data transfer operations are performed using channel command words (CCW) which are transferred from the host system 4 to the storage controller 20 along a channel path. The host system 4 may view the storage controller 18 as a multitude of separate control unit images or logical subsystems (LSSs), wherein each control unit image provides access to one or more I/O devices or LSS images of the DASD 30. Further details of how the host system 4 may communicate with the storage controller 20 are described in the commonly assigned and co-pending patent applications, all of which are incorporated herein by reference in their entirety: "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. Pat. Ser. No. 09/167,782; "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. Pat. Ser. No. 09/168,017; "Method, System, and Program for Performing Data Transfer Operations on User Data," by Brent C. Beardsley and Michael A. Paulsen, filed on the same date hereof and having attorney docket no. TU9-99-020.

The KSDS index 12 includes the key fields of the records and a relative byte address (RBA) that points to the CI that includes the user data record identified by the key field. The operating system 6 can calculate a CCHH location from the RBA as known in the art. The KSDS index 12 is organized in a tree structure. The entry node in the tree includes the high key value of the keys for the first sequential group of user records (r) that fit in the first CI and a RBA pointing to the physical CCHH location of the track including the first CI. When a CI is filled with user records (r), then the next group of user records, having key values sequential with respect to the records in the filled CI, will be placed in the next CI. The KSDS index 12 will then have a pointer from the first CI in the tree to the second CI that includes the next group of user records (r), sequential with respect to key values (K). This second index entry in the KSDS index 12 includes the high key value of those records in this second CI and the RBA of the second CI that includes such next sequential set of records.

Figure 2:
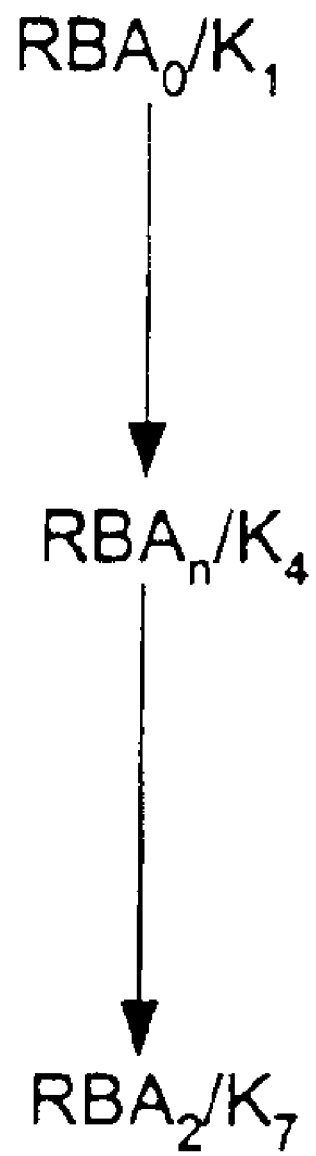
FIG. 2 illustrates a block diagram of data structures utilized with preferred embodiments of the present invention.

FIG. 2 provides an example of the arrangement of the KSDS index 12. In this example, there are sequential keys $K_0$–$K_7$, which are key values uniquely identifying user data records (r). The first $CI_0$ in the KSDS index 12 can store records $K_0$ and $K_1$. Thus, the first entry in the KSDS index 12 would include the high key value of the user data records in the first $CI_0$ and the $RBA_0$ of that $CI_0$. In the example of FIG. 2, the next group of user data records are placed in the nth $CI_n$, which is not physically contiguous to the first CI. The $CI_n$ may have to be used for the next sequential group of user data records, identified by keys $K_2$ and $K_4$, if there is CI splitting. In the example of FIG. 2, $CI_n$ can store the next three user data records corresponding to keys $K_2$ thru $K_4$. The second KSDS index 12 entry to which the first index entry points would thus include the high key value $K_4$ and the $RBA_N$ of $CI_n$, which is not contiguous to the first index entry $RBA_0$. In the example of FIG. 2, $CI_2$, which has a physical location contiguous to the first $CI_1$, can store the next three data records, having keys $K_5$ thru $K_7$. Thus, the third KSDS index 12 entry would include the high key value $K_7$ of the user data records stored in the $CI_2$ located at $RBA_2$, which is at a physical contiguous location to the first $CI_1$ starting at the physical location specified by $RBA_1$. In this way, the KSDS index 12 is logically contiguous with respect to key values, corresponding to user data records (r), but may not map those logically sequential data records, i.e., key values (K), to contiguous physical locations. Details on the VSAM implementation are described in IBM publication "VSE/VSAM User's Guide and Application Programming, Version 6 Release 1," IBM document no. SC33-6632-00 (Copyright IBM Corp. 1979, 1995) and the commonly assigned patent entitled "Method and Means for Cataloging Data Sets Using Dual Keyed Data Sets and Direct Pointers," U.S. Pat. No. 4,408,273, which publication and patent are incorporated herein by reference in their entirety Data Transfer Operations The CCW format provides a format for a sequence of commands used to transfer data between the host system 4 and storage controller 20. The first command in the chain is a Define Extent command which defines the extent or range of tracks in which a channel program will operate. An extent is a set of consecutively addressed tracks that the channel program in the host 4 can access. The limits of an extent are defined by specifying the addresses of the first and last tracks in the extent. The Define Extent command further defines attributes of, and limitations on, the commands that follow in the channel program. Following is a Locate Record or Locate Record Extended command that specifies the operations, the number of consecutive records (or tracks) involved in the data operation, and the address of the first track and the orientation state to establish before starting data transfer. One or more read or write commands may follow the Locate Record command to perform data transfer operations. The storage controller 20 will perform the requested operation with respect to the DASD 30 and present status information to the host 4 indicating whether the operation failed or successfully completed.

Preferred embodiments include an additional command, referred to herein as a "Prestage Trackset" command, that is utilized within a CCW chain to provide notification to the storage controller 20 that a set of tracks will be accessed in a future operation. The Prestage Trackset command is included with a Locate Record Extended command and may be specified with a Prestage Trackset operation code within a Locate Record Extended parameter. If the Prestage Trackset operation code is specified, then the Locate Record Extended command would contain an Extended Parameter that provides a bit map of a range of tracks. Values in the bit map may be set to "0" or "1." A "1" value indicates that the track corresponding to the bit map value is to be prestaged into the cache 22, whereas a bit map value of "0" indicates that the corresponding track is skipped and not prestaged into cache 22. A Count parameter of the Locate Record Extended command indicates the number of tracks to be transferred with the Prestage Trackset operation. The Count parameter is equal to the number of bit map values of one in the Extended Parameter bit map, i.e., those tracks in the range of sequential tracks to be prestaged.

The first bit in the bit map must be '1' and represents the track whose address is specified in the seek address parameter. Subsequent addressed tracks are in ascending order. In preferred embodiments, tracks in the bit map represented by one bits are not limited to the tracks contained within the extent domain defined in the Define Extent.

In preferred embodiments, a single CCW chain may include a Prestage Trackset command and data transfer commands. The Prestage Trackset command would prestage data in anticipation of read requests for such data in subsequent CCW chains. The read operations in the CCW chain including the Prestage Trackset should be for data tracks that were prestaged into cache in a previous CCW chain. In this way, in a single CCW chain, tracks that will be needed in future operations can be prestaged into cache and tracks previously prestaged can be read from cache.

Data transfer operations in the CCW chain including the Prestage Trackset command would follow a Locate Record or Locate Record Extended command specifying such data transfer operations. This subsequent Locate Record or Locate Record Extended command would follow the Locate Record Extended Command including the Prestage Trackset operation. Thus, in preferred embodiments, the data transfer operations occur in a Locate Record domain following the execution and completion of the Prestage Trackset operation. This insures that tracks are prestaged before any subsequent data transfer operations are performed. Further, in preferred embodiments, the Extended Parameter bit map used by the Prestage Trackset command may specify tracks to prestage that are not within the domain specified in the Define Extent command beginning the CCW chain including the Prestage Trackset operation. In a chain including both the Prestage Trackset operation and data transfer commands, the Define Extent domain may specify the range in which data operations are performed and Prestage Trackset operations may fall outside of this domain. In further embodiments, Prestage Trackset operations and read operations can occur in any order in a CCW chain.

Figure 3:
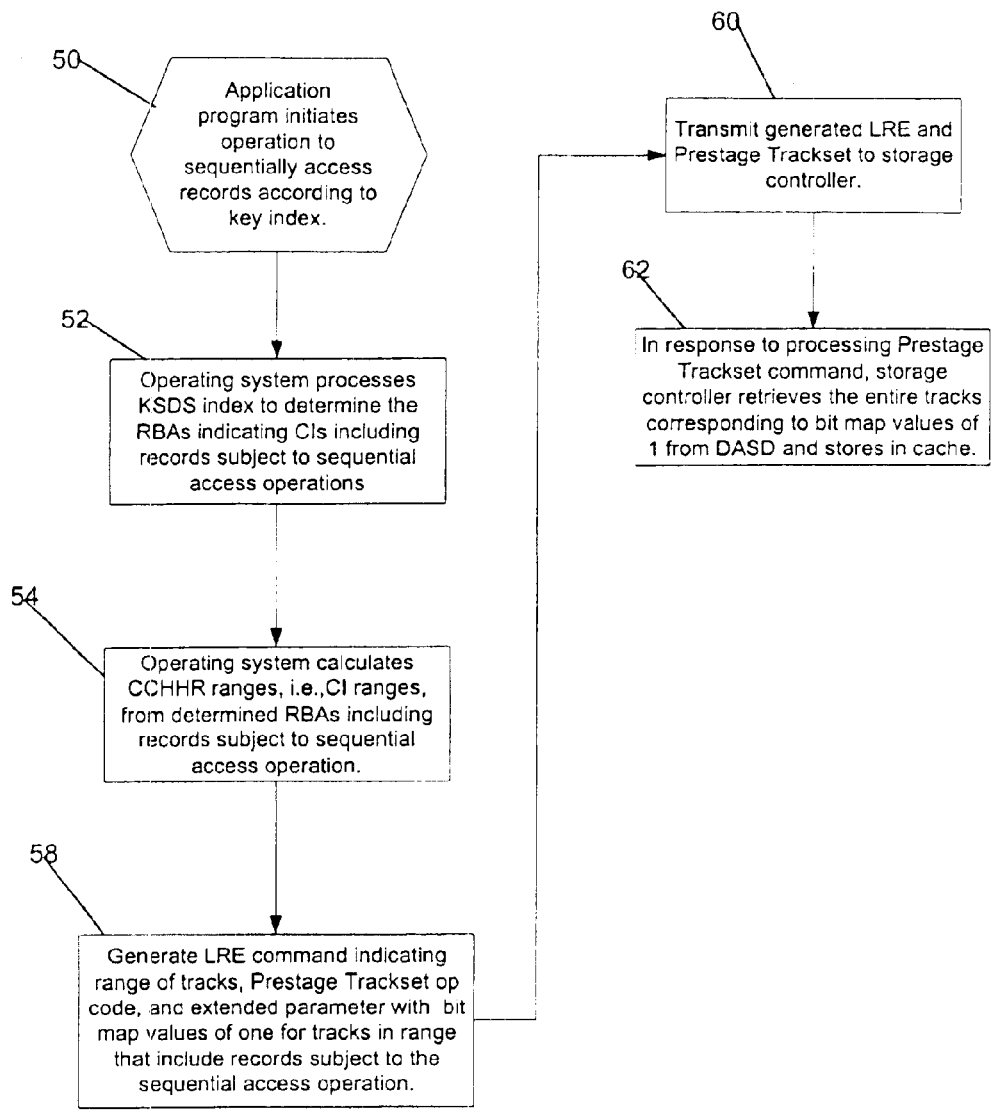
FIG. 3 illustrates logic to prestage data in accordance with preferred embodiments of the present invention.

FIG. 3 illustrates program logic to generate and process the Prestage Trackset command within both the host 4 and storage controller 20 systems. The operations shown in FIG. 3 as implemented in the host 4 and storage controller 20 may be executed asynchronously. Control begins at block 50 where the application program 8 initiates an operation to sequentially access numerous user data records according to a key index ordering assigned by the application program 8. The application program 8 maintains information on the logical sequential arrangement of user data records according to key (K) values, as well as information about free space; such information is unknown to the storage controller 20. The operating system 6 would then process (at block 52) the KSDS index 12 to determine the RBAs pointing to CIs including the records (r) subject to the sequential access operations. The operating system 6 then calculates (at block 54) the CCHHR ranges, i.e., CI ranges, from the determined RBAs including records subject to sequential access operations. The CCHHR range of the CI can be determined from the RBA as the RBA indicates the starting CCHHR of the CI and the CI has a fixed length which is used to determine the ending CCHHR of the CI. As discussed, these CCHHR ranges, i.e., CIs, including the logically sequential user records (r) may be at non-contiguous physical locations.

The operating system 6 would then generate (at block 58) a CCW chain including a Locate Record Extended command indicating a range of tracks, a Prestage Trackset operation code, and an Extended Parameter bit map indicating, with a bit map value of one, all tracks within the range of tracks that include user data records subject to the application's 8 sequential operation. For tracks that contain nothing but free space, corresponding bits in the Prestage Trackset bit map will always be zero. The operating system 6 would then transfer (at block 60) the CCW chain to the storage controller 8. In preferred embodiments, the CCW chain including the Prestage Trackset operation may include an additional Locate Record domain with read commands. In response to receiving the Prestage Trackset command, the storage controller 20 would retrieve (at block 62) the data on the tracks having a corresponding bit map value of one in the Extended Parameter bit map. In preferred embodiments, the Prestage Trackset command causes the storage controller 20 to transfer the entire contents of a track, including the count and key data, into the cache 22. After prestaging the data into cache 22, the storage controller 20 would return a channel end and device end status. Following the prestage operation, the host 4 may then, within the same CCW chain, transfer data transfer operations.

In this way, with the Prestage Trackset command, the host 4 can have data records that may be stored at non-contiguous physical locations staged into cache 22 in anticipation that a host 4 application program, such as the application program 8, is sequentially accessing such data records according to a logical arrangement of data, e.g., according to key.

The Prestage Trackset command of the preferred embodiments may be utilized with the Read Track Data command described in the co-pending and commonly assigned patent application entitled, "Method, System, and Program for Performing Data Transfer Operations on User Data," by Brent C. Beardsley and Michael A. Paulsen, filed on the same date hereof and having attorney docket no. TU9-99-020, incorporated by reference above. The Read Track Data command requests the storage controller 20 to transfer to the host 4 all the user data records on a track, following the first user data record, $R_0$, free of any of the count and key data on the track.

Figure 4:
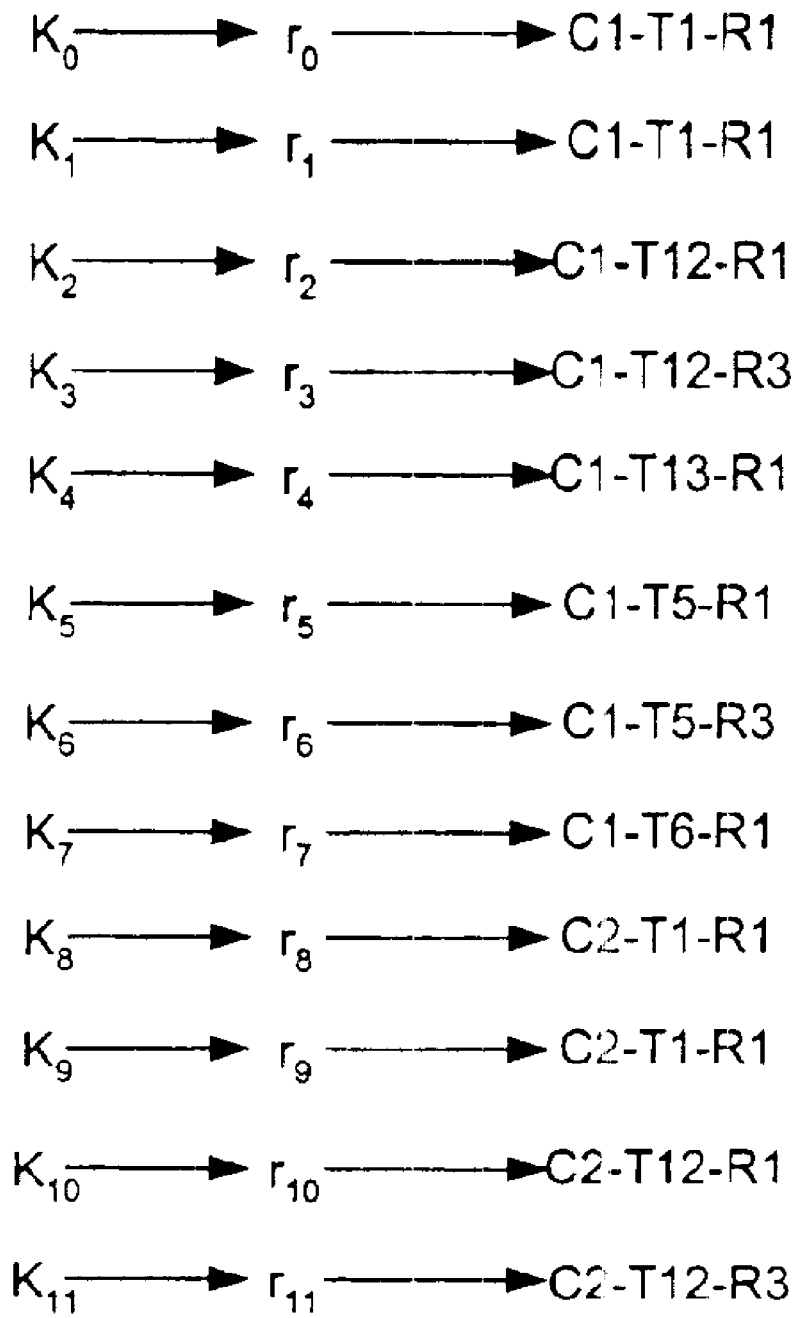
FIG. 4 illustrates a mapping of key values, user data records, and physical storage locations that is utilized with preferred embodiments of the present invention.

FIG. 4 illustrates how user data records $r_0$–$r_{11}$, which are organized sequentially with respect to keys $K_0$–$K_{11}$, map to non-contiguous physical locations, e.g., CCHHR locations, in the DASD 30. As discussed, the data records (r) are not stored sequentially to match the logical sequential key ordering as a result of CI and CA splitting. For example, $r_0$, which is the first record in the key ordering, is in the CI starting at cylinder 1 (C1), track 1 (T1), and the first CKD record (R1). The next record $r_1$ in the logical sequential ordering, having key value $K_2$, is stored in the same CI as $r_0$. User record $r_2$ is stored in track 12. Thus, the logically sequential user records $r_0$–$r_2$ are stored at non-contiguous physical locations.

Below is pseudo code for three CCW chains generated by the host 4 to prestage data before and during the application program 8 sequentially accessing the records corresponding to the first twelve key values, $K_0$ thru $K_{11}$, as shown in FIG. 4. A CCW chain may use the Prestage Trackset command in combination with one or more Read Track Data Commands. Two Locate Record Extended (LRE) commands may be included in a CCW chain, one for the Prestage Trackset command and the other for a string of Read Track Data commands. The Locate Record Extended command for the Prestage Trackset operation would prestage tracks having a bit map value of one in the Extended Parameter bit map. A second Locate Record Extended command may follow the Locate Record Extended command for the prestage trackset operation. This second Locate Record Extended command may specify an Extended Parameter bit map of non-sequential tracks in a range of tracks subject to a sequence of Read Track Data commands to read user data records from the tracks having a bit map value of one. In preferred embodiments, the host 4 would transfer the read commands and accompanying Locate Record command after receiving channel end and device end status indicating completion of the prestage operation.

Below are three exemplary operations to prestage user data records and transfer user data records while the application program 8 is sequentially accessing and processing records $r_0$ thru $r_{11}$, ordered sequentially with respect to key values $K_0$ thru $K_{11}$, as shown in FIG. 4.

Operation 1

Define Extent (C1-T1 to (C2-T12);
Locate Record Extended (Prestage Trackset, Bit map of twelve values representing tracks 1-12, with bit map values of 1 for tracks 1 and 12);

Operation 2

Define Extent (C1-T1 to (C2-T12);
Locate Record Extended (Prestage Trackset, Bit map of 13 values representing tracks 1–13, with bit map values for tracks 5, 6, and 13 set to 1)
Locate Record Extended (Read Track op code, Read Trackset with bit map of twelve values with bit map values for tracks 1 and 12 set to 1);
Read Track Data from track 1;
Read Track Data from track 12;

Operation 3

Define Extent (Range C1-T5 to C1-T13)
Locate Record Extended (Prestage Trackset, Bit map with twelve values with bit map values for tracks 1 and 12 in cylinder 2 set to 1);
Locate Record Extended (Read Track op code, Read Trackset with bit map of nine values with bit map values for tracks 5, 6, and 13 in cylinder 1 set to 1);
Read Track Data from track 5 in cylinder 1;
Read Track Data from track 6 in cylinder 1;
Read Track Data from track 13 in cylinder 1;

Operation 4

Define Extent (Range C2-T1 to C2-T12)
Locate Record Extended (Read Track op code, Read Trackset with bit map of twelve values with bit map values for tracks 1 and 12 in cylinder 2 set to 1);
Read Track Data from track 1 in cylinder 2;
Read Track Data from track 12 in cylinder 2;

In operation 1, the host 4 is performing set-up operations to prestage the tracks including the first four records to be sequentially accessed, $r_0$ to $r_3$ by the application program 8. As discussed there may be multiple user records (r) in a CKD record identified according to CCHHR. The host 4 sends a Prestage Trackset command to the storage controller 20 to prestage tracks 1 and 12 from cylinder 1 into the cache 22. The parameters in the Define Extent command refer to the start and end of the extent in which the following operations will be performed.

After prestaging the first set of records, $r_0$ to $r_3$, the host 4 will issue a CCW operation 2 including a Prestage Trackset operation to prestage the tracks including the next four records, $r_4$ to $r_7$, to be sequentially accessed. The Define Extent command specifies a range of tracks, tracks 1–12, that include the tracks that will be read in the CCW chain of operation 2, and does not include the tracks to prestage that are outside of the domain of the tracks to read. For this reason, the Define Extent command in Operation 2 does not specify tracks to prestage, such as track 13, that are outside of the domain including the tracks to read. Following is a Locate Record Extended command including a bit map indicating the tracks T1 and T12 that include the first four records, $R_0$ to $R_3$, that the application program 8 will access. Following is a sequence of Read Track Data commands to read the all user data records, free of any count or key information, from tracks 1 and 12 including user data records $R_0$ to $R_3$ which were prestaged into cache 22 in the CCW chain of operation 1. The sequence of Read Track Data commands apply to the tracks indicated in the Read Trackset bit map having a corresponding bit map value of one. Alternatively, the host 4 may use a sequence of Read Data commands to read a specific user data record from the tracks previously prestaged into cache 22, instead of using the Read Track Data command to read all the records from a track previously prestaged into cache 22. In both cases, because the requested data was prestaged into cache 22, the storage controller 20 may return the data from cache 22.

After operation 2, the application program 8 may begin performing operations on the first four sequential user data records $R_0$ to $R_3$ after the records are transferred from the cache 22 to the host 4. In operation 3, as the application program 8 is processing the first four records $R_0$ to $R_3$ as part of a sequential operation, the host 4 performs operation 3 by issuing a Locate Record Extended command indicating the Prestage Trackset operation to cause the storage controller 20 to prestage from the DASD 30 into cache 22 those tracks T1 and T12 in cylinder 2 including the user data records $R_8$ to $R_{11}$. The host 4 would specify in the Extended Parameter bit map that tracks 1 and 12 on cylinder 2 are to be prestaged into cache 22. The second Locate Extended Record command indicates a bit map indicating that tracks 5, 6, and 13 are subject to a series of read operations to read the user data records from the CKD records in tracks 5, 6, and 13, which were previously prestaged into cache 22 in operation 2. The read operation may comprise a Read Track Data command or Read Data command to read specific user data records prestaged into cache 22.

After performing operation 3, the application program 8 may then process user data records $R_4$ to $R_7$. While processing these records, the host 4 may then perform operation 4 to retrieve the final set of logically sequential records $R_8$ to $R_{11}$ that the application program 8 will process. Operation 4 consists of a Locate Record Extended command indicating a read operation code, for a Read Track Data command or Read Data command, to be performed on the tracks corresponding to bit map values of one in the Extended Parameter bit map provided with the Locate Record Extended command.

With the above four operations, the host 4 may cause the storage controller 20 to prestage non-contiguous tracks into cache 22 in anticipation that the host 4 will later request user data records from these tracks for a sequential operation performed on user data records arranged in a logical sequence according to a key or other index type value. In this way, the host 4 can retrieve user data records the application program 8 needs without having to wait for the storage controller 20 to perform mechanical set-up operations to retrieve the data from DASD 30, e.g., track and seek movements to position a read head or tape set-up operations. Instead, the storage controller 20 may return the requested data directly from cache 22.

Preferred embodiments thus allow an application performing a sequential processing operation on user data records according to a logical sequential ordering to immediately access the user data records that are in the logical sequential order, but stored at non-contiguous physical locations. This provides an operation sequentially accessing records according to a logical key ordering that are stored at noncontiguous physical locations with the same performance that is achieved when performing a sequential operation on data that is stored at contiguous physical locations.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Preferred embodiments were described with respect to sequential data transfer operations which involve reading or writing numerous, user data records in a logical sequential relationship. However, in alternative embodiments, the preferred embodiment commands, such as the Prestage Trackset command, may be used to prestage tracks in preparation for non-sequential, direct processing or random data transfer operations.

Preferred embodiments provided specific naming conventions for the data transfer operations described herein, such as Prestage Trackset, Read Data, Read Track Data, etc. However, any naming scheme or format may be used in implementing the commands which perform the functions described herein.

Preferred embodiments were described with respect to a storage controller, host, and DASD system. In alternative embodiments, the preferred embodiment commands may be used with any type of storage system arrangement, where one processing unit performs data operations with respect to a storage device by communicating with another processing unit that manages and controls access to the storage device. The storage device storing the data may be any storage device known in the art, including volatile and non-volatile storage devices, such as tape drives, flash memory, optical disk drives, etc. For instance, the commands may be used with any processor-to-processor communication, regardless of the environment in which the processors are implemented, i.e., the same computer, a network environment, etc. Further the cache 22 may be any type of volatile or non-volatile storage area utilized by the storage controller 20 for data transfer operations.

Preferred embodiments were described as implemented with certain operating system and application programs. However, these components were described as one preferred implementation. The preferred embodiment commands may be utilized in any operating system environment and with any application program which sequentially processes user data records maintained in a logical sequential ordering. Preferred embodiments are particularly applicable to situations where the application program wants the performance of a sequential type operation on the logically arranged records.

Preferred embodiments were described with respect to the CKD record format, where user data is stored in CKD records on a track, such that each CKD record includes a count field and may include a key field. The preferred embodiment commands may apply to other data storage formats in which data is stored in records that include index information, such as the count and/or key type information, along with the user data. Further preferred embodiments may apply to the SCSI storage format which stores data in fixed blocks without the use of index information with each data record. The prestaging methods of the preferred embodiments may further be used with the partition data set extended (PDSE) storage format in which records are stored as fixed block records.

In the SCSI or PDSE formats, the preferred embodiment commands may be used to prestage data stored at non-sequential fixed block addresses on the storage device to a cache in anticipation of sequential data operations performed on data records physically stored at non-sequential fixed block addresses on the storage device. Thus, those skilled in the art will appreciate that the preferred embodiment commands may apply to any data storage format where data records maintained in a logical sequential ordering may nonetheless be stored at non-sequential physical locations on the storage medium.

Preferred embodiments were described with respect to a KSDS index used to map logically sequential records to relative byte address (RBAs) that are converted to CCHHR locations. However, the index used to map the logically sequential records to physical locations may comprise any such mapping and indexing technique known in the art. For instance, if the data format is SCSI, then the index may include entries indicating fixed block addresses as the starting address of a range of logically sequential records, as opposed to the RBA value that indicates a CCHHR location.

Preferred embodiments were described with respect to a bit map data structure that indicated tracks to prestage. In alternative embodiments, the unit to prestage may be different than a track, such as a one or more records, fixed blocks, etc. Still further, data structures other than a bit map may be used to indicate the data unit to prestage into cache.

In summary, preferred embodiments disclose a method, system, and program for prestaging data into cache from a storage system in preparation for data transfer operations. A first processing unit communicates data transfer operations to a second processing unit that controls access to the storage system. The first processing unit determines addressable locations in the storage system of data to prestage into cache and generates a data structure capable of indicating contiguous and non-contiguous addressable locations addressable locations in the storage system including the data to prestage into the cache. The first processing unit transmits a prestage command to the second processing unit. The prestage command causes the second processing unit to prestage into cache the data at the addressable locations indicated in the data structure. The first processing unit then requests data at the addressable locations indicated in the data structure. In response, the second processing unit returns the requested data from the cache.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for prestaging data into cache from a storage system in preparation for data transfer operations, wherein a first processing unit communicates data transfer operations to a second processing unit that controls access to the storage system, comprising the first processing unit:

determining logically sequential records in the storage system of data to prestage into cache;

determining physical locations in the storage system including the determined logically sequential records, wherein the determined physical locations are capable of addressing contiguous and non-contiguous physical locations in the storage system;

generating a data structure capable of indicating contiguous and non-contiguous physical locations in the storage system including the logically sequential records to prestage into the cache;

transmitting a prestage command to the second processing unit which controls access to the storage system, wherein the prestage command causes the second processing unit to prestage into cache the data logically sequential records at the physical locations indicated in the data, structure; and requesting logically sequential records at the physical locations indicated in the data structure, wherein the second processing unit returns the requested data from the cache.

2. The method of claim 1, wherein the physical locations in the storage system including the logically sequential records are at non-contiguous physical locations in the storage system.

3. The method of claim 1, wherein the logically sequential records are determined from a Volume Storage Access Method (VSAM) Key Sequenced Data Set (KSDS) index.

4. The method of claim 1, wherein the storage system storage space is logically divided into multiple tracks, wherein each track includes one or more data records, wherein each data record includes an index area providing index information on the content of the data record and a user data area including user data, wherein the physical locations indicated in the data structure comprise tracks in the storage system including the logically sequential records to prestage into the cache.

5. The method of claim 1, wherein the requested data that the second processing unit returns from cache was prestaged into cache in a command sequence preceding the command sequence including the data request.

6. The method of claim 1, wherein the prestage command causes the second processing unit to prestage into cache the logically sequential records at the physical locations indicated in the data structure by causing the second processing unit to prestage into the cache logically sequential records at non-contiguous physical locations in the storage system if the data structure indicates non-contiguous physical locations and prestage data at contiguous physical locations in the storage system it the data structure indicates contiguous physical locations.

7. The method of claim 1, wherein the data structure is transmitted with the prestage command to the second processing unit.

8. A method for prestaging data into cache from a storage system in preparation for data transfer operations, wherein a first processing unit communicates data transfer operations to a second processing unit that controls access to the storage system, comprising the second processing unit:

receiving a prestage command from the first processing unit and a data structure capable of indicating contiguous and non-contiguous physical locations having logically sequential records in the storage system to prestage into the cache;

prestaging into the cache the logically sequential records at the physical locations indicated in the data structure;

receiving a data request from the first processing unit for logically sequential records at the physical locations indicated in the data structure; and returning to the first processing unit the requested logically sequential records from the cache.

9. The method of claim 8, wherein the physical locations in the storage system including the logically sequential records are at non-contiguous physical locations in the storage system.

10. The method of claim 8, wherein the storage system storage space is logically divided into multiple tracks, wherein each track includes one or more data records, wherein each data record includes an index area providing index information on the content of the data record and a user data area including user data, wherein the physical locations indicated in the data structure comprise tracks in the storage system including the logically sequential records to prestage into the cache.

11. The method of claim 8, wherein the data request from the first processing unit is for data that was prestaged into cache in a command sequence preceding the command sequence including the data request.

12. A system for transferring commands to a controller to prestage data into a cache from a storage system controlled by the controller in preparation for data transfer operations, comprising:

a processing unit;

program logic executed by the processing unit, comprising:

(i) means for determining logically sequential records at addressable locations in the storage system of data to prestage into cache;

(ii) determining physical locations in the storage system including the determined logically sequential records, wherein the determined physical locations are capable of addressing contiguous and non-contiguous physical locations in the storage system;

(iii) means for generating a data structure capable of indicating contiguous and non-contiguous physical locations having the logically sequential records in the storage system including the data to prestage into the cache;

(iv) means for transmitting a prestage command to the controller, wherein the prestage command causes the controller to prestage into cache the logically sequential records at the physical locations indicated in the data structure; and (v) means for requesting the logically sequential records at the physical locations indicated in the data structure from the controller, wherein the controller returns the requested data from the cache.

13. The system of claim 12, wherein the physical locations in the storage system including the logically sequential records are at non-contiguous physical locations in the storage system.

14. The system of claim 12, wherein the logically sequential records are determined from a Volume Storage Access Method (VSAM) Key Sequenced Data Set (KSDS) index.

15. The system of claim 12, wherein the storage system storage space is logically divided into multiple tracks, wherein each track includes one or more data records, wherein each data record includes an index area providing index information on the content of the data record and a user data area including user data, wherein the physical locations indicated in the data structure comprise tracks in the storage system including the logically sequential records to prestage into the cache.

16. The system of claim 12, wherein the requested data is for data that was prestaged into cache command sequence preceding the command sequence including the data request.

17. The system of claim 12, wherein data in the storage system is in a count-key-data format, and wherein the system comprises a host computer system and the controller comprises a storage controller, and the storage system comprises a direct access storage device (DASD).

18. The system of claim 12, wherein the prestage command causes the second processing unit to prestage into cache the logically sequential records at the physical locations indicated in the data structure by causing the second processing unit to prestage into the cache the logically sequential records at non-contiguous physical locations in the storage system if the data structure indicates non-contiguous physical locations and prestage data at contiguous physical locations in the storage system if the data structure indicates contiguous physical locations.

19. The system of claim 12, wherein the data structure is transmitted with the prestage command to the second processing unit.

20. A controller for prestaging data in preparation for data transfer operations from a computer system, wherein the controller controls access to a storage system, comprising:

a processing unit;

a cache accessible to the processing unit;

program logic executed by the processing unit, comprising:

(i) receiving a prestage command from the first processing unit and a data structure capable of indicating contiguous and non-contiguous physical locations in the storage system having logically sequential records in the storage system to prestage into the cache;

(ii) prestaging into the cache the logically sequential records at the physical locations indicated in the data structure;

(iii) receiving a data request from the first processing unit for logically sequential records at the physical locations indicated in the data structure; and (iv) returning to the first processing unit the requested logically sequential records from the cache.

21. The controller of claim 20, wherein the physical locations in the storage system including the logically sequential records are at non-contiguous addressable locations in the storage system.

22. The controller of claim 20, wherein the storage system storage space is logically divided into multiple tracks, wherein each track includes one or more data records, wherein each data record includes an index area providing index information on the content of the data record and a user data area including user data, wherein the physical locations indicated in the data structure comprise tracks in the storage system including the logically sequential records to prestage into the cache.

23. The controller of claim 20, wherein the data request from the first processing unit is for data that was prestaged into cache in a command sequence preceding the command sequence including the data request.

24. The controller of claim 20, wherein data in the storage system is in a count-key-data format, and wherein the computer system comprises a host computer system and the controller comprises a storage controller, and the storage system comprises a direct access storage device (DASD).

25. An article of manufacture including prestage commands to prestage data into cache from a storage system in preparation for data transfer operations, wherein a first processing unit communicates data transfer operations to a second processing unit that controls access to the storage system, the article of manufacture comprising computer readable storage media including at least one computer program embedded therein that is capable of causing the first processing unit to perform:

determining logically sequential records in the storage system to prestage into cache;

determining physical locations in the storage system including the determined logically sequential records, wherein the determined physical locations are capable of addressing contiguous and non-contiguous physical locations in the storage system;

generating a data structure capable of indicating contiguous and non-contiguous physical locations in the storage system including the logically sequential records to prestage into the cache;

transmitting a prestage command to a second processing unit which controls access to the storage system, wherein the prestage command causes the second processing unit to prestage into cache the logically sequential records at the physical locations indicated in the data structure; and requesting logically sequential records at the physical locations indicated in the data structure, wherein the second processing unit returns the requested data from the cache.

26. The article of manufacture of claim 25, wherein the logically sequential records are determined from a Volume Storage Access Method (VSAM) Key Sequenced Data Set (KSDS) index.

27. The article of manufacture of claim 25, wherein the physical locations in the storage system including the logically sequential records are at non-contiguous physical locations in the storage system.

28. The article manufacture of claim 25, wherein the storage system storage space is logically divided into multiple tracks, wherein each track includes one or more data records, wherein each data record includes an index area providing index information on the content of the data record and a user data area including user data, wherein the physical locations indicated in the data structure comprise tracks in the storage system including the logically sequential records to prestage into the cache.

29. The article of manufacture of claim 25, wherein the requested data that the second processing unit returns from cache was prestaged into cache in a command sequence preceding the command sequence including the data request.

30. The article of manufacture of 25, wherein the prestage command causes the second processing unit to prestage into cache the logically sequential records at the physical locations indicated in the data structure by causing the second processing unit to prestage into the cache the logically sequential records at non-contiguous physical locations in the storage system if the data structure indicates non-contiguous physical locations and prestage data at contiguous physical locations in the storage system if the data structure indicates contiguous physical location.

31. The method of claim 25, wherein the data structure is transmitted with the prestage command to the second processing unit.

32. An article of manufacture including prestage commands to prestage data into cache from a storage system in preparation for data transfer operations, wherein a first processing unit communicates data transfer operations to a second processing unit that controls access to the storage system, the article of manufacture comprising computer readable storage media including at least one computer program embedded therein that is capable of causing the second processing unit to perform:

receiving a prestage command from the first processing unit and a data structure capable of indicating contiguous and non-contiguous physical locations having logically sequential records in the storage system including the data to prestage into the cache;

prestaging into the cache the logically sequential records at the physical locations indicated in the data structure;

receiving a data request from the first processing unit for logically sequential records at the physical locations indicated in the data structure; and returning to the first processing unit the requested logically sequential records from the cache.

33. The article of manufacture of claim 32, wherein the physical locations in the storage system including the logically sequential records are at non-contiguous physical locations in the storage system.

34. The article of manufacture of claim 32, wherein the storage system storage space is logically divided into multiple tracks, wherein each track includes one or more data records, wherein each data record includes an index area providing index information on the content of the data record and a user data area including user data, wherein the physical locations indicated in the data structure comprise tracks in the storage system including the logically sequential records to prestage into the cache.

35. The article of manufacture of claim 32, wherein the data request from the first processing unit is for data that was prestaged into cache in a command sequence preceding the command sequence including the data request.

36. A computer readable memory device accessible to a processing unit, wherein the memory device includes a prestage command and a data structure capable of indicating contiguous and non-contiguous physical locations in a system including logically sequential records to prestage into a cache from the storage system in preparation for data transfer operations between a first processing unit and second processing unit, wherein the prestage command and the data structure are communicated from the first processing unit to the second processing unit, and wherein the prestage command is capable of causing the second processing unit to prestage into the cache the logically sequential records at the physical locations indicated in the data structure.

37. The memory device of claim 36, wherein the physical locations in the storage system including the logically sequential records are at non-contiguous physical locations in the storage system.

* * * * *